US009096158B2

(12) United States Patent
Herbst

(10) Patent No.: US 9,096,158 B2
(45) Date of Patent: Aug. 4, 2015

(54) VENTILATED PADDING FOR A VEHICLE SEAT

(75) Inventor: Gerald Herbst, Sulzback-Rosenberg (DE)

(73) Assignee: GRAMMER AG, Amberg (DE)

( * ) Notice: Subject to any disclaimer, the term of this patent is extended or adjusted under 35 U.S.C. 154(b) by 385 days.

(21) Appl. No.: 13/513,311

(22) PCT Filed: Dec. 3, 2010

(86) PCT No.: PCT/EP2010/068839
§ 371 (c)(1),
(2), (4) Date: Aug. 8, 2012

(87) PCT Pub. No.: WO2011/067379
PCT Pub. Date: Jun. 9, 2011

(65) Prior Publication Data
US 2012/0299358 A1    Nov. 29, 2012

(30) Foreign Application Priority Data
Dec. 4, 2009  (DE) .......................... 10 2009 057 072

(51) Int. Cl.
*B60N 2/58*    (2006.01)
*B60N 2/56*    (2006.01)
(52) U.S. Cl.
CPC ............ *B60N 2/5664* (2013.01); *B60N 2/5657* (2013.01); *B60N 2/5685* (2013.01)
(58) Field of Classification Search
USPC .............. 297/452.45, 452.26, 452.47, 452.43
See application file for complete search history.

(56) References Cited

U.S. PATENT DOCUMENTS

| 3,391,413 | A | | 7/1968 | Crane |
| 4,529,248 | A | | 7/1985 | Trotman et al. |
| 4,866,800 | A | * | 9/1989 | Bedford .......................... 5/652.1 |
| 4,901,387 | A | * | 2/1990 | Luke ................................ 5/730 |
| 5,153,956 | A | * | 10/1992 | Nold .............................. 428/218 |
| 5,226,188 | A | * | 7/1993 | Liou ................................. 5/653 |
| 5,243,722 | A | * | 9/1993 | Gusakov ......................... 5/655.3 |
| 5,626,387 | A | * | 5/1997 | Yeh ........................... 297/180.14 |
| 5,628,079 | A | * | 5/1997 | Kizemchuk et al. ............... 5/653 |
| 5,640,728 | A | * | 6/1997 | Graebe ............................ 5/606 |
| 5,645,314 | A | * | 7/1997 | Liou ........................... 297/180.14 |
| 5,692,952 | A | * | 12/1997 | Chih-Hung ................... 454/120 |
| 6,018,832 | A | * | 2/2000 | Graebe ............................. 5/654 |
| 6,546,578 | B1 | * | 4/2003 | Steinmeier ........................ 5/653 |
| 6,598,251 | B2 | * | 7/2003 | Habboub et al. .................. 5/654 |
| 6,701,556 | B2 | * | 3/2004 | Romano et al. ................... 5/653 |
| 6,901,617 | B2 | * | 6/2005 | Sprouse et al. .................... 5/654 |
| 6,938,290 | B2 | * | 9/2005 | McKinney et al. ................ 5/654 |
| 7,108,319 | B2 | * | 9/2006 | Hartwich et al. ............ 297/180.1 |
| 2008/0073966 | A1 | * | 3/2008 | Ali et al. .................... 297/452.46 |

FOREIGN PATENT DOCUMENTS

| DE | 202004018918 | 4/2006 |
| DE | 102005061105 | 7/2007 |
| DE | 102007027828 | 5/2008 |
| DE | 202007004929 | 8/2008 |
| DE | 102007031322 | 10/2008 |
| WO | 2006102751 | 10/2006 |

* cited by examiner

*Primary Examiner* — David R Dunn
*Assistant Examiner* — Tania Abraham
(74) *Attorney, Agent, or Firm* — Lowe Graham Jones PLLC

(57) ABSTRACT

A vehicle seat with a seat part and a backrest having a simple design of a cushion that provides a passive aeration or a passive climate seat while maintaining a visually appealing top side or front side, respectively.

12 Claims, 9 Drawing Sheets

VENTILATED PADDING FOR A VEHICLE SEAT

PRIORITY CLAIM

This invention claims priority from PCT Application Serial No. PCT/EP2010/068839 filed on Dec. 3, 2010 which claims priority to German Application Serial No. 102009057072.1 filed on Dec. 4, 2009, which are hereby incorporated by reference.

FIELD OF THE INVENTION

The invention relates to a cushion with aeration for a vehicle seat, in particular a cushion for a seat part and/or a backrest of a vehicle seat, which is made air-permeable and resilient 1.

BACKGROUND OF THE INVENTION

Up to now, numerous vehicle seats with cushions or cushion parts are known, which have an active or passive seat or backrest aeration. An active seat aeration is a design of the cushion in which air is actively supplied to the cushion or cushion part, for example by means of a fan.

In the case of a passive aeration of a vehicle seat, frequently also referred to as a "passive climate seat", a vehicle seat is involved in which the supply or removal of air takes place on the basis of the presence of for example aeration ducts and without [an] appliance supplying this air flow.

A cushion for a seat part and/or a backrest of a vehicle seat is known for example from EP 0 936 105 B1, having a ventilation layer through which air can flow and which comprises an air- and water-permeable upper layer and lower layer and spacing web[s] holding the latter at a distance and connected together. In addition, fans or ventilators are provided for blowing air into the ventilation layer. An active aeration is thus involved. The density of the spacing webs is selected to be greater in the longitudinal direction of the cushion than in the width-wise direction of the cushion.

A cushion part for a lower seat part and/or a backrest of an air-conditioned vehicle seat with an air-permeable cushion base part is known from EP 1 417 114 B1. An air-permeable air-conditioning layer, which comprises at least two subsidiary layers, is arranged on the cushion base part. One of these layers, namely the upper layer, has at least proportionately activated carbon which is incorporated in particle form. Both this upper layer and the second subsidiary layer and the cushion base part rest one upon the other in a closed manner, so that an air circulation which should take place by means of openings arranged on the cushion base part has to function through these subsidiary layers. Nevertheless an air flow of this type or an air circulation of this type can take place only to a limited degree when the seat is in a state of occupancy. These layers are then in fact compressed as a result of the weight of the person occupying the seat and they make it more difficult for a flow of air to pass through.

Such a compression of layers arranged at the top and thus the prevention of an air flow are avoided in a simple manner in DE 1 989 306 in that through openings extending in the vertical direction extend over the entire thickness of the cushion and thus terminate on the top side with openings directly at the person who is occupying the seat at that time. As a result, on the one hand the overall appearance of the vehicle seat is adversely affected on account of the visible arrangement of a multiplicity of holes. On the other hand through openings of this type which are accessible in an open manner at the top are susceptible to the accumulation of dirt. For this reason, designs of this type are frequently not desired.

A drawback of the prior art outlined above is that either a relatively complicated design of the cushion is necessary in order to permit at least a passive aeration for example of a part of a vehicle seat, or visually unappealing surfaces of the cushion which are easily soiled are present.

SUMMARY OF THE INVENTION

The present invention provides a vehicle seat with a seat part and a backrest which has a simple design of a cushion which is to provide a passive aeration or a passive climate seat and which has a visually appealing top side or front side respectively.

In a preferred embodiment of the present invention having a cushion for a seat part and/or a backrest of a vehicle seat which is made air-permeable and resilient, the cushion comprising a cushion base part and a seat cover arranged thereon, the cushion base part has nubs extending preferably at a right angle to the top side of the seat. In their cross-section, as viewed transversely to their vertical direction, these nubs can be round, elliptical, polygonal, rectangular and/or square. They advantageously have a trapezoidal, rectangular or hyperholoid shape in their cross-section with respect to their vertical direction.

An adept distribution of the nubs in a manner dependent upon the differing pressure stressing of the seat cushion or backrest cushion by a person occupying the vehicle seat can ensure a flow of air and a flow of water vapour through interspaces present between the nubs even in the state in which the vehicle seat is occupied, and at the same time it is possible to maintain an adequate counter pressure on account of the nubs with respect to the pressure produced by the weight of the person. In this respect the nubs, which are advantageously designed in the form of partial nubs of foam, act as distance members and together with the interspaces arranged between them form a sort of ventilation layer inside the cushion.

In this case the nubs can be arranged both in line and offset with respect to one another. By way of example, as viewed from the front side of the vehicle seat the nubs can be arranged in rows adjacent to one another along a face of the cushion base part arranged at the top, the nubs being arranged precisely adjacent to one another. Alternatively, as viewed in the longitudinal direction of the vehicle seat every second row of nubs can be arranged offset to the preceding row of nubs, provided that a seat part is involved which should have a cushion of this type according to the invention.

As a result of an adept arrangement of these nubs, a pressure release can be achieved in a purposeful manner in specified regions of the seat part or a backrest part in a manner dependent upon the height of the nubs—which can be made different—and upon their density of arrangement in specified regions. This applies for example in the region of the buttocks or the thighs of a person in order to optimize the seating comfort. It is possible, for example, for the height of the nubs to be lower in the region of the thighs than in the remaining regions of the cushion for the seat part in order to permit an improved seating on the vehicle seat in this way.

On account of the tapered design of the nubs, it is advantageous for ducts to be provided in the interspaces which are not made constant in cross-section. As a result, it can be made possible for various numbers of air masses to be able to circulate or to pass through in parallel or along the surface of the cushion base part arranged at the top in a manner dependent upon the height with respect to the surface.

The interspaces, i.e. the duct-like aeration paths made available by their connection to one another, open into air removal and supply ducts arranged laterally on the cushion base part and emerging laterally on the vehicle seat, so that air can flow both in and—in a simple manner—out during the movement of the person on the seat part.

To this end the cushion base part advantageously has, in addition, through openings or through ducts which are arranged at least in part between the nubs preferably at a right angle to the top part of the seat. Through ducts of this type extend preferably through the entire cushion base part and optionally a seat plate element which is arranged thereunder and which can be a component part of a seat shell for example.

This manner of arrangement of through ducts ensures an additional aeration from the underside of the vehicle seat. A design of this type can, of course, also be transferred to the backrest, in which an additional aeration would then take place from the rear side of the backrest.

The through ducts or through openings are preferably used for the dissipation of the moist, warm air, which is produced by the person sitting on the vehicle seat, and for the supply of dry, cool air in the region of the cushion and thus for the cooling of those portions of the person who is in contact with the seat part. The density of the openings or the distances between the individual openings relative to the top surface of the cushion base part respectively should thus be chosen in such a way that the through openings occur as frequently as possible per unit of the surface. Nevertheless, this must be chosen in a manner dependent upon the strength requirements of the sub-structure of the seat part, like the seat plate element or the seat underbody.

The through openings or through ducts respectively should preferably be positioned where large quantities of moisture or water vapour may be expected. This relates in particular to regions below the thighs and around the buttocks and when the invention is implemented in the backrest region in the region of the lumbar lordosis pad for the person using the vehicle seat.

In addition, this supply and removal of air or removal of water vapour respectively is assisted by the fact that the air removal and supply ducts which have already been mentioned and which preferably extend in the horizontal direction on the front side of the seat part, i.e. are not directly acted upon with pressure by the seated person, assist the air removal and air supply process. In accordance with a preferred embodiment the interspaces have a distance between adjacent nubs in a range of from 5 to 20 mm, preferably from 5 to 12 mm, in the state of the unoccupied vehicle seat and a range of from 5 to 15 mm, preferably of 8 mm, in the longitudinal direction 12 mm of the vehicle seat and of 12 mm diagonally to the longitudinal direction of the vehicle seat in the state of the occupied vehicle seat. As a result, a flow of air and a flow of water vapour is provided between the nubs even when the vehicle seat is occupied and at the same time an adequate stability of the cushion, and in particular of the cushion base part, is made available for the person.

The nubs are advantageously formed with a height of from 5 to 20 mm, preferably from 8 to 10 mm, and in a particularly preferred manner of 8 mm, in the state of the re-occupied vehicle seat and can be compressed resiliently downwards from above. In addition, the nubs can also be altered in their width-wise direction, i.e. can become wider when the vehicle seat is occupied.

In accordance with a preferred embodiment the nubs can be additionally covered at the top—in the sequence as viewed towards the top from below—by a ventilation layer and/or a cut foam layer and/or a heating layer and/or a heating layer and/or a moisture-absorbing layer. Although it is advantageously possible to dispense with a ventilation layer as a result of the formation of nubs on the top face of the cushion base part, a ventilation layer of this type can further reinforce the ventilation effect.

BRIEF DESCRIPTION OF THE DRAWINGS

Further advantageous embodiments are set out in the sub-claims. Advantages and expedient properties may be seen in the following description in conjunction with the drawings. In the drawings

DETAILED DESCRIPTION OF THE PREFERRED EMBODIMENT

Figure 1:
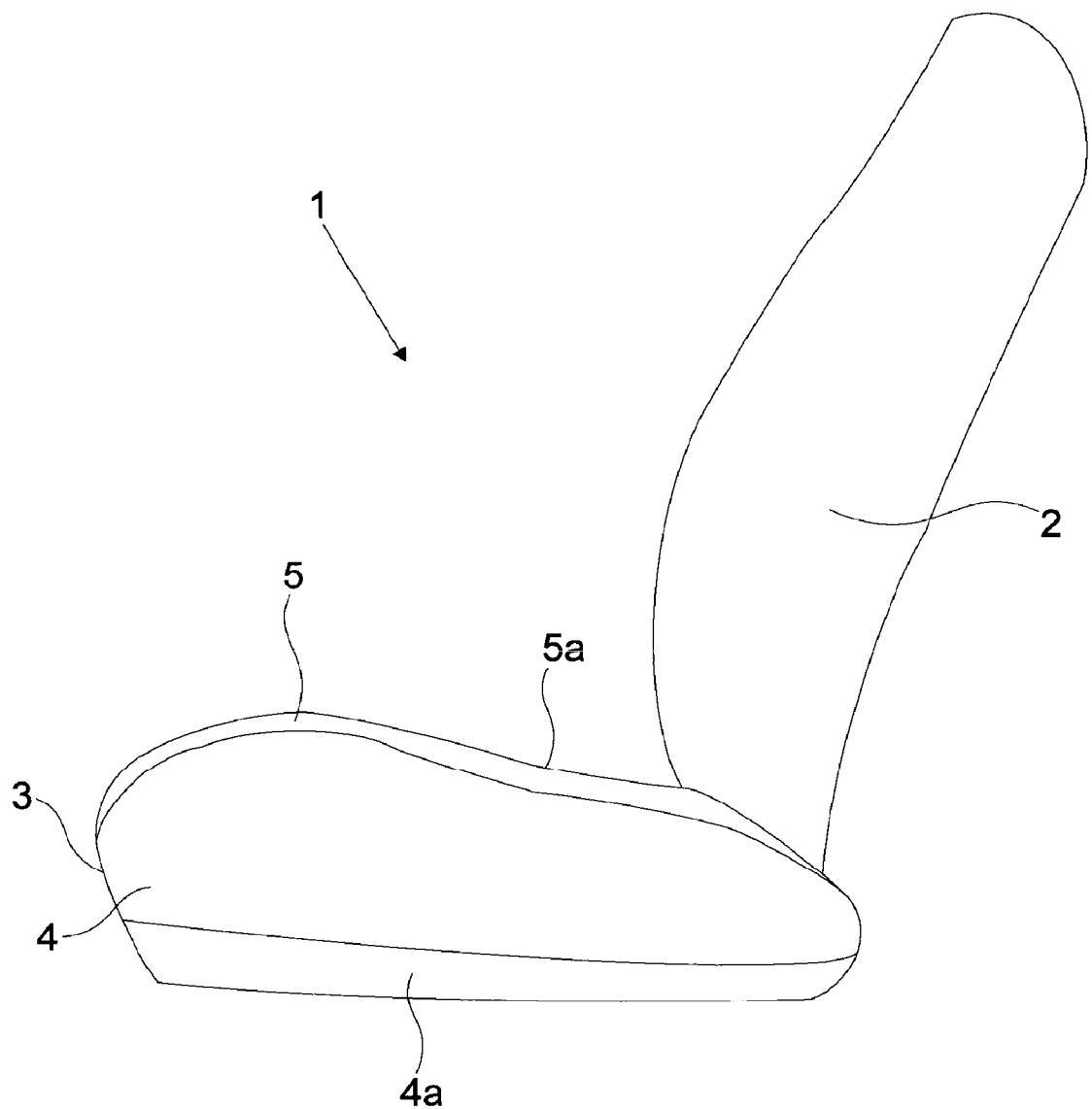
FIG. 1 is a diagrammatic illustration of a vehicle seat in a generally customary form.

A vehicle seat with a generally customary design may be seen in FIG. 1. The vehicle seat 1 has a backrest 2 and a seat part 3. The seat part 3 comprises a seat structure, such as a seat plate 4a, which is preferably formed from a non-resilient material. In addition, the seat part 3 has a cushion which comprises a cushion base part 4 and a seat cover 5 which is arranged on the top part.

Figure 2:
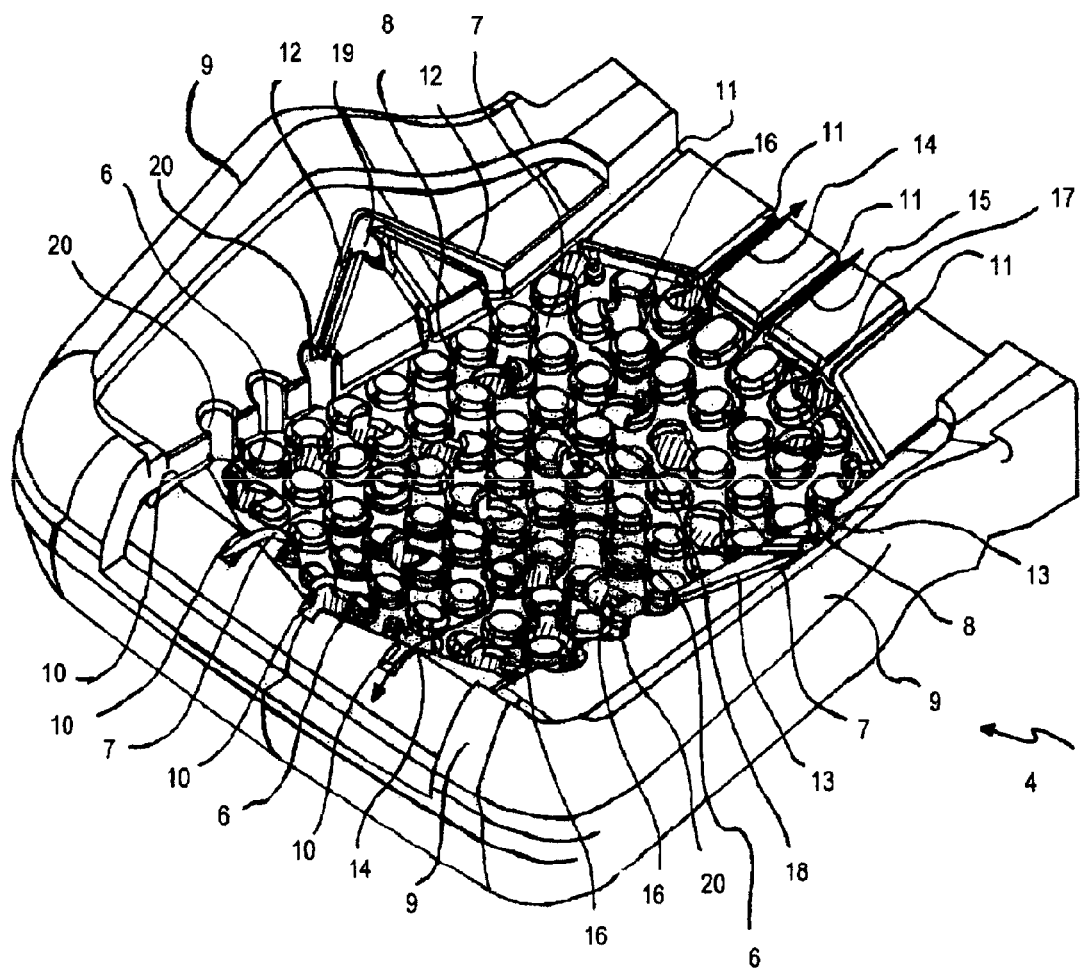
FIG. 2 is a perspective illustration of a cushion base part according to the invention of a vehicle seat according to an embodiment of the invention.

The cushion base part 4 is shown in greater detail in FIG. 2. This may be a material made air-permeable and resilient. It is preferable for foam parts or foam materials to be used for this.

The cushion base part 4 has numerous nubs 6 on a surface 4b situated at the top, it being possible for the nub distribution to extend over the surface in the middle of the seat, as shown here, or, in addition, in the region 9 of the lateral part situated at the side (not shown here). The nubs extend towards the seat surface 5a.

Interspaces 7 between the nubs 6 as viewed in the diagonal direction and further interspaces 8 between the nubs 6 as viewed in the longitudinal direction of the seat or in the width-wise direction of the seat are used to allow air flows and water vapour flows between the nubs. This is indicated for example by the arrows 14, 15, 17 and 18.

As viewed in their cross-section, i.e. in the direction along the seat surface, the nubs are advantageously made circular and/or elliptical. As viewed in the vertical direction they can be made trapezoidal, as shown in greater detail for example in FIG. 4. In this way, the interspaces arranged between the nubs constitute air ducts with cross-sections of different thickness in a manner dependent upon the height at which they are viewed. On account of the larger cross-section of the interspaces an increased aeration will thus take place in the upper region of the nubs, and a smaller air flow will be perceptible in the lower region. This leads to the person who occupies the seat part at the top experiencing an increased aeration at the bottom.

The interspaces open into longitudinal ducts 10 and 11 which on the front and rear sides emerge almost horizontally out of the cushion base part 4 and, as a result, permit a flow out and a flow in of air as well as water vapour, as indicated by the arrows 14 and 15.

In addition, ducts 12 and 13 are arranged at the side in the region of the lateral plate of the cushion base part 4 in order to obtain an exchange of air in this region for the lateral parts of the bottom of the person who is occupying the seat.

It is advantageous for through ducts or through bores 16 to be present, distributed over the entire area, on which nubs are arranged or are not arranged. These through openings or through ducts 16 extend from the top side of this cushion base part 4 downwards through a seat plate (not shown in detail here) below. This allows an additional aeration from the underside towards the top and constitutes a possibility of both ventilation and aeration, as indicated by the arrows 17 and 18. These take place in interaction with ducts which are situated between the nubs and which are formed by the interspaces 7, 8.

It is preferable for the through openings to be used to remove moist, warm air. Dry, cool air is conveyed in the other direction towards the top from below. A density of these through openings or through ducts should be as high as possible in its distribution, so that a maximum aeration is possible, but the strength requirements for the substructure, such as a seat plate, should not fail to be met.

The diameter of through ducts and through openings of this type is preferably between 15 and 20 mm.

One or more through openings or through ducts respectively, which has or have both circular and polygonal cross-sections, can permit an additional lateral aeration in a region of a lateral plate of the seat and for example also in the region of a lateral plate of the back. These through openings are indicated by the reference numbers 20 and 19 and can interact with ducts 12 as well as the interspaces 7, 8 which likewise represent ducts in a certain sense. This also applies to the ducts 10, 11.

It is advantageous for laterally arranged through openings of this type to be required when the ventilation layer of the level of the middle of the seat formed by the nubs and interspaces does not communicate with that of the region of a lateral plate. This can be the case for example when a longitudinal anchoring of the seat cover (not shown here) separates the two regions from each other.

It is advantageous for the through openings or through ducts respectively to be connected to the surface region by horizontal ducts. This can also take place on the underside of the cushion base part, so that, as a result, an additional exchange of air and/or water vapour can occur in this region.

Figure 3:
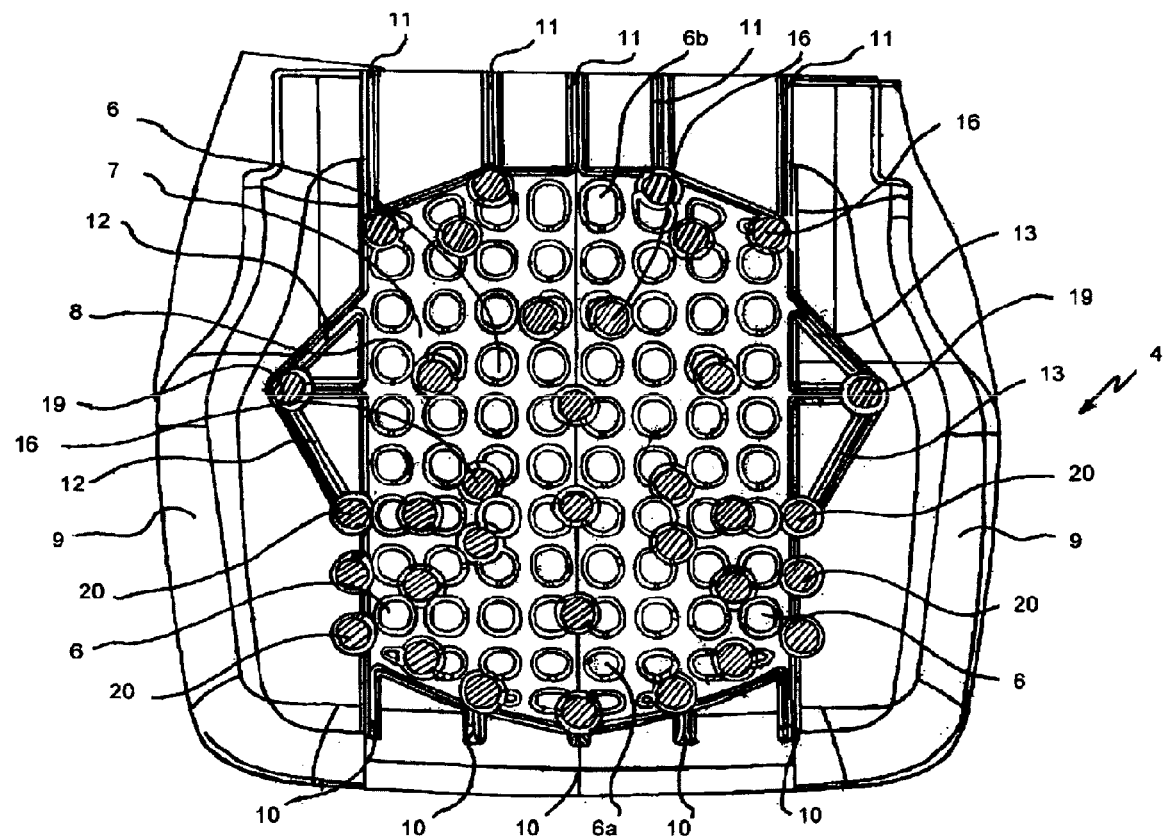
FIG. 3 is a top view of the cushion base part illustrated in FIG. 2.

With reference to FIG. 3 which is a top view of the cushion base part as shown in FIG. 2, it can be further shown that in their cross-section the nubs can be made both elliptical in accordance with the reference number 6a and virtually circular in accordance with the reference number 6 or oval in accordance with the reference number 6b.

In the same way, the distance 7 in the diagonal direction between two nubs and the distance 8 in the longitudinal or width-wise direction between two nubs is again shown more clearly in FIG. 3.

The through openings or through ducts 16 respectively may also be seen more clearly in their distribution. It is evident from this that, in the region of the thighs and the posterior region in which a pronounced formation of heat mainly takes place, a large number of through openings or through ducts 16 respectively are present in order to permit an adequate dissipation of heat and at the same time also an adequate dry air supply.

Figure 4:
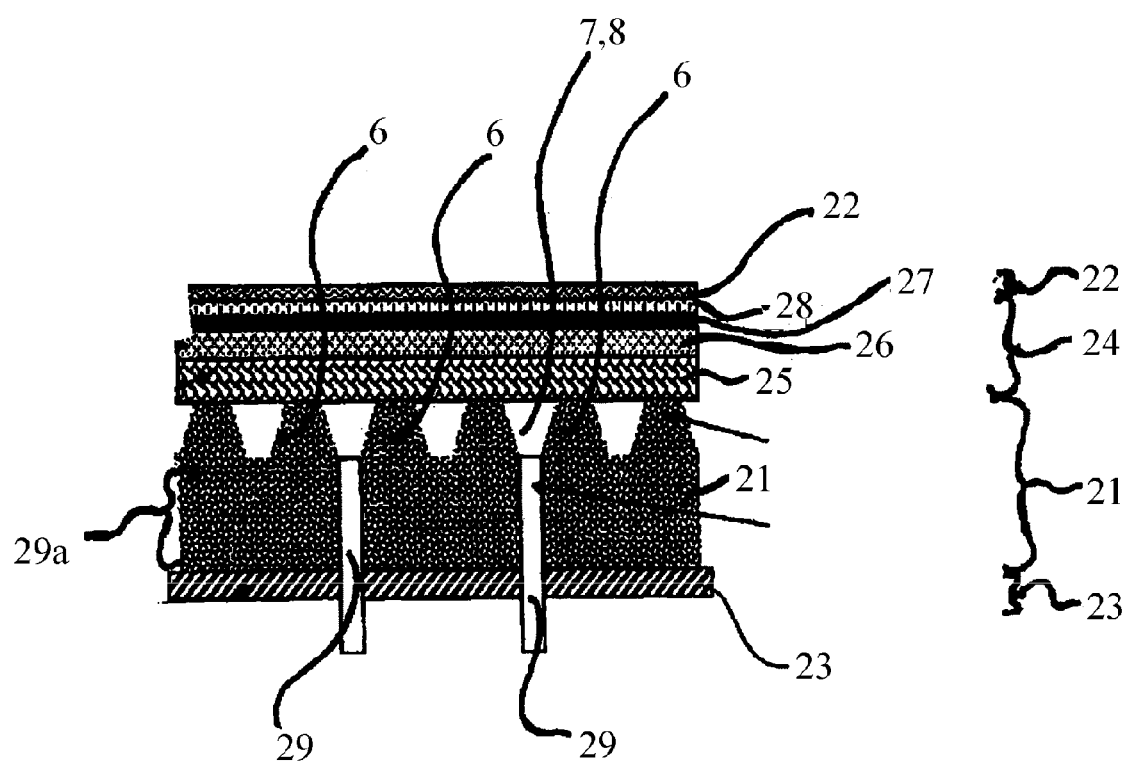
FIG. 4 is a cut-away cross-sectional illustration of a possible design of the cushion according to the invention, which can be used for a part of a vehicle seat.

A possible design of the cushion according to the invention with numerous additional layers is illustrated in a cut-away manner in a cross-sectional illustration in FIG. 4. It is evident from this illustration that a cushion base part 21 and a seat cover 22, which can consist of a textile material or a material like leather or similar to leather, are present. A plurality of layers are arranged in one portion 24 between the seat cover 22 and the cushion base part 21.

The cushion base part 21, which can be a foam part, has the nubs 6 in a trapezoidal shape, i.e. in a frustoconical shape as viewed in three dimensions. Below that a portion 29a is present which is designed in the form of a layer of foam material. A substructure in the form of a seat plate or a hard shell is arranged below the cushion base part 21.

It is clearly evident from the illustration that through openings or through ducts 29 respectively, as has been described above with the reference number 16, are preferably arranged between the nubs 6 and pass through the entire partial layer of foam material 29a including the seat plate 23 situated below it. As a result, air can pass upwards from below into the ventilation layer which is formed by the nubs and the interspaces 7, 8 situated between them. Heat which is developed by the occupation of the seat can be dissipated downwards from above in the other direction.

A ventilation layer 25 or a ventilation covering respectively, such as a knitted spacer fabric, a coconut fibre mat or a layer of non-woven fabric, is arranged in the intermediate structure according to the portion 24 as viewed upwards from below. The hardness of the covering should be selected to be such as to ensure an acceptable degree of seating comfort and seating pressure. In a preferred embodiment, the compression hardness should amount to between 7 and 9 kPa.

The thickness of a ventilation cover 25 of this type is preferably between 8 and 12 mm. Preferably the air permeability of this ventilation cover 25 is above a value of 3,000 1/dm2. A cut foam layer 26, which is also present on the open-celled or reticulated foam material and/or an air-permeable non-woven fabric, is arranged on this knitted spacer fabric 25 or the ventilation covering 25 respectively. In this embodiment, the air permeability is over 1,500 mm/s. In order to improve the air flow or air throughput further, the cut foam insert 26 or cut foam layer 26 can be additionally perforated. In this case a diameter of approximately 10 mm has been found effective as the perforation size. The distance between the openings is then between 8 and 12 mm.

A heating layer 27, which can be in the form of heating mats for example, is provided as the next layer. The heating mats preferably have an air permeability of more than 1,500 mm/s. Where appropriate, the carrier material of the heating mats can be additionally perforated. The heating mats should be flexible and should not have any significant influence upon the seating comfort.

An absorber layer 28, which can be for example an activated carbon non-woven fabric layer or a SAP system layer which has a textile character, is present as a further layer. The absorber layer 28 should be inserted directly below the seat cover, i.e. below a textile or sheet of leather. Care should be taken to ensure an air permeability of at least 1,500 mm/s. Where appropriate, this layer has to be additionally perforated. A diameter of approximately 10 mm has been found effective as the perforation size. The distance between the openings is then between 8 and 15 mm.

As the textile, the seat cover can in principle have any type of textile which has an air permeability of more than 800 mm/s. Textiles which have a 3D structure and which thus have a positive effect upon the micro climate are particularly suitable for this. This applies for example to knitted velvet and needle bar velvet as well as 3D knitted fabrics. In order to prevent moisture buffering and to ensure a rapid removal of moisture, a fibre material with as little water storage capacity as possible should be chosen.

Figure 5:
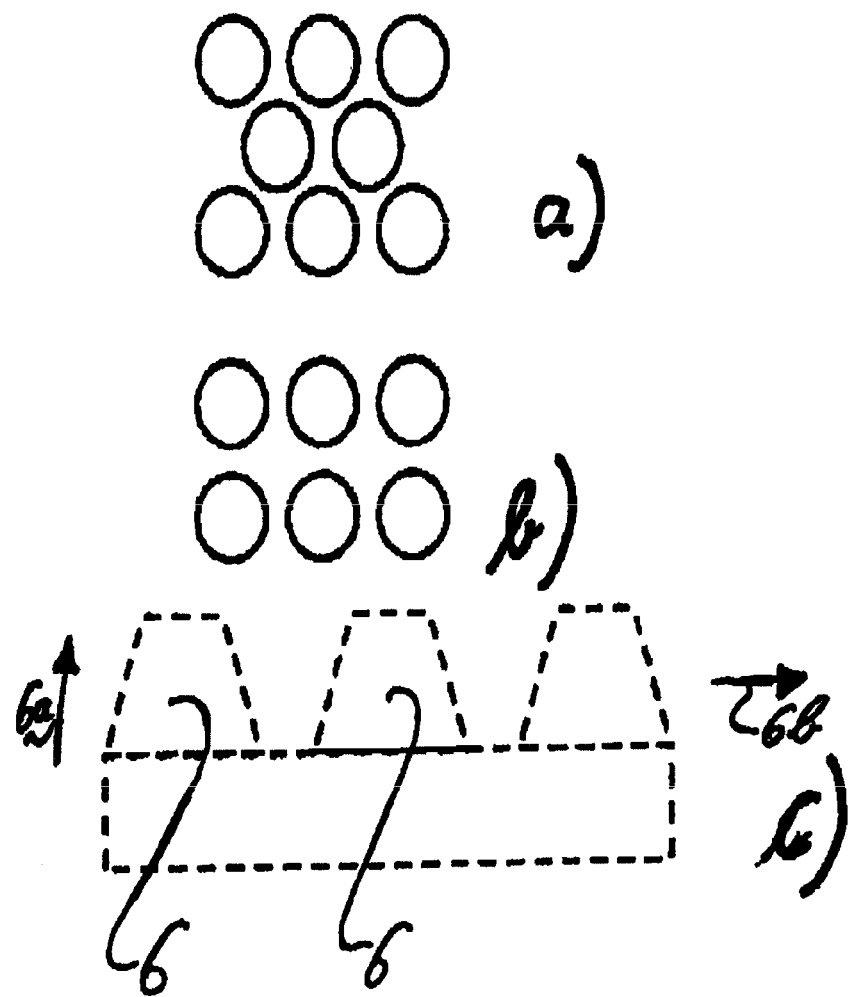
FIG. 5 shows two possible arrangements of the nubs of the cushion according to the invention.

It is evident from FIG. 5 how the nubs can be arranged on the top surface of the cushion base part 4. By way of example they can be arranged in rows in accordance with illustration b) with nubs arranged directly adjacent to one another. In accordance with illustration a) these rows are offset with respect to one another, i.e. every second row is offset by half the length of a nub with respect to the row viewed previously in the longitudinal direction and/or in the width-wise direction. As a result, the thickness of the nubs to be provided is increased, but also the probability of the lower air through-flow through the interspaces between the nubs.

It is likewise evident from FIG. 5c that the nubs 6 can be trapezoidal in the vertical direction 6c and circular, elliptical, polygonal or square in the direction (6d) which extends transversely or at a right angle to the vertical direction (6c), i.e. which can extend substantially horizontally.

Figure 6:
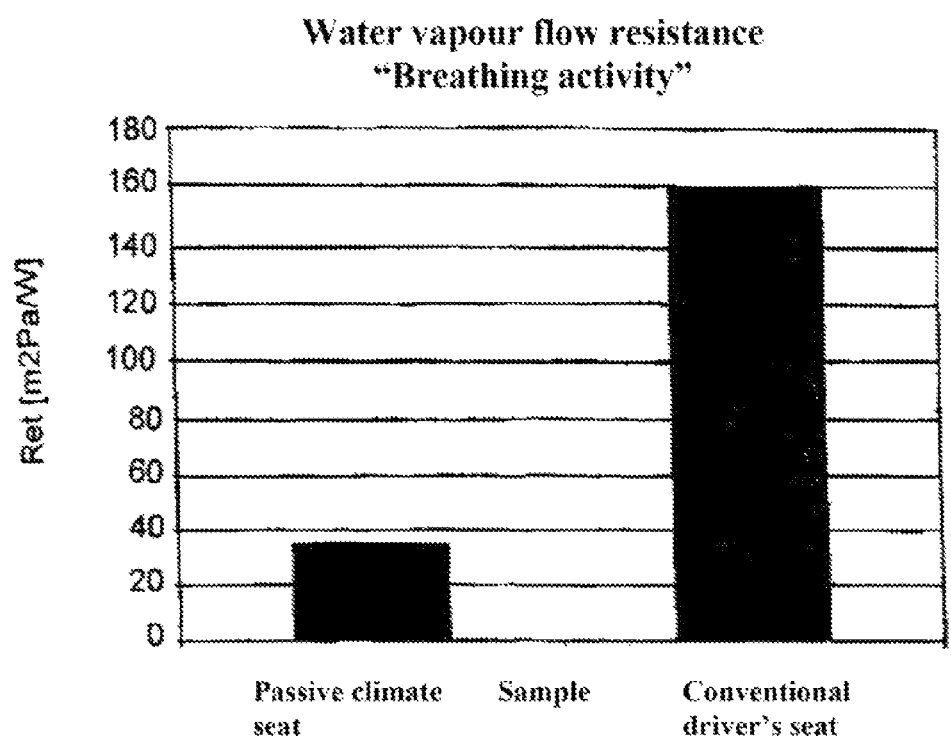
FIG. 6 is a diagram of first measurement results from a comparison between the cushion according to the invention and a conventional cushion for vehicle seats.

First measurement results in a comparison between a cushion according to the invention and a conventional cushion for vehicle seats are reproduced in a diagram in FIG. 6. The water vapour permeability resistance at a minimum requirement of Ret [$m^2Pa/W$]<40 is plotted on the ordinate and the sample is plotted on the abscissa. It is clearly evident that the water vapour permeability resistance, which reproduces the breathing activity, is four times greater in the case of the conventional driver's seat than in the case of the cushion according to the invention for a vehicle seat.

Figure 7:
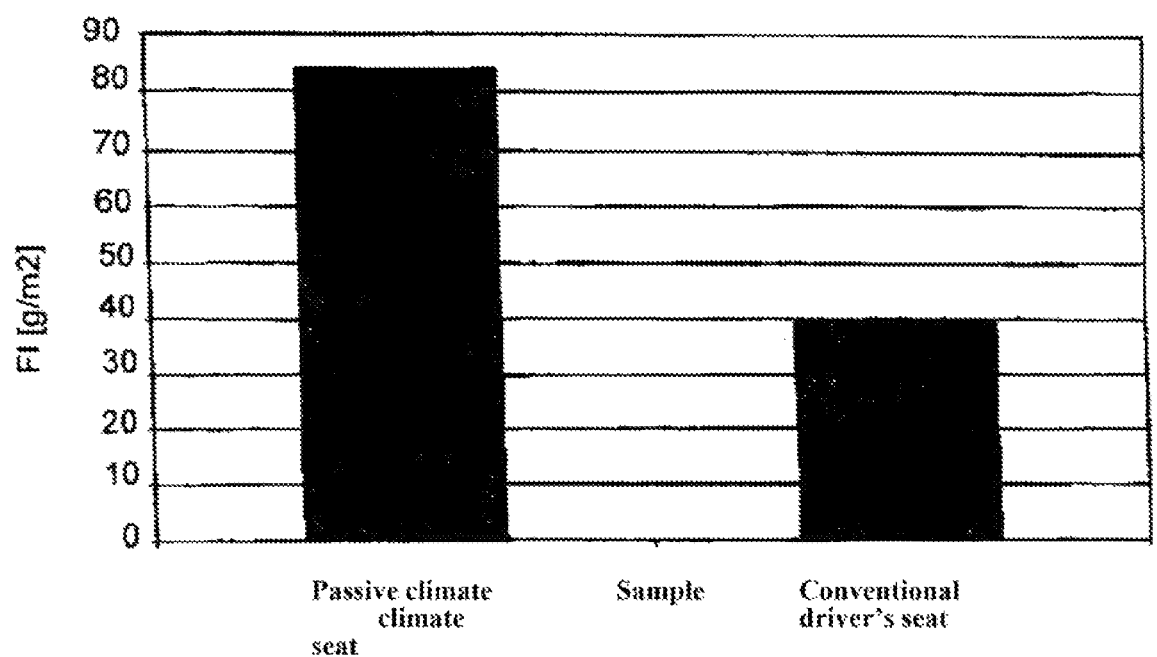
FIG. 7 shows second measurement results from a comparison between a cushion according to the invention and a conventional cushion for vehicle seats.

In the same way, the water vapour absorption capacity with a minimum requirement of Fi [$g/m^2$]>50 is reproduced plotted over the ordinate in FIG. 7 as a second measurement result. It is likewise evident from this that the water vapour absorption capacity is more than twice as great in the case of the cushion according to the invention as compared with conventional cushions.

Figure 8:
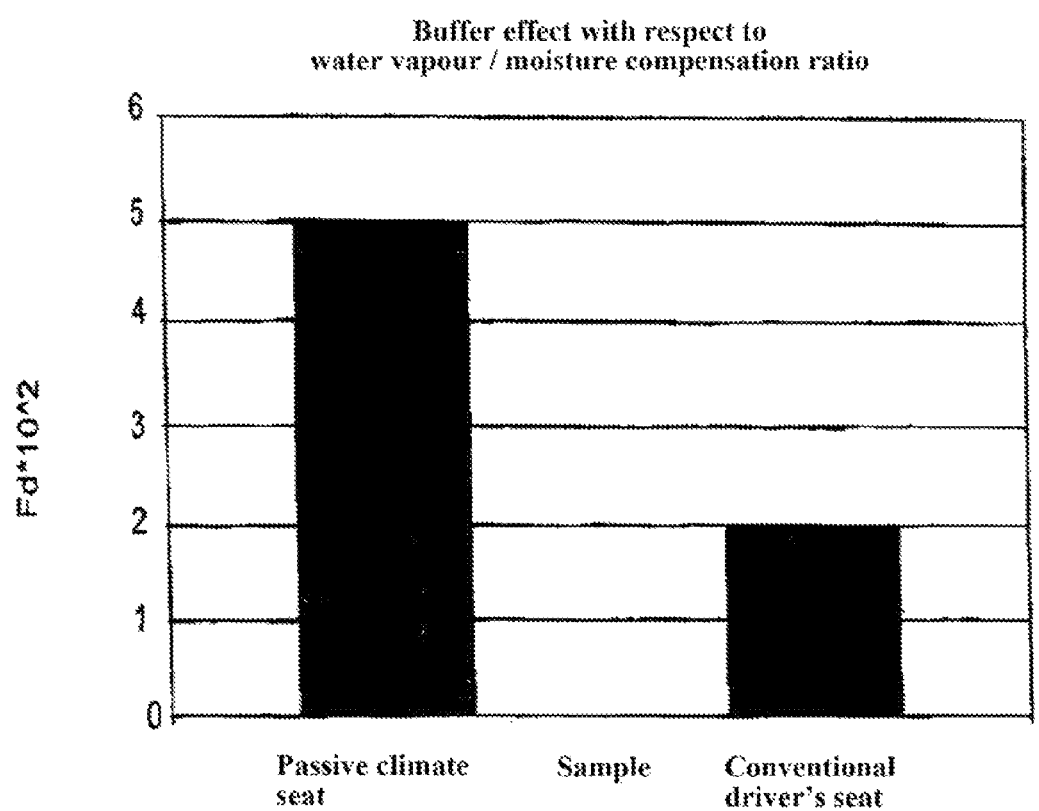
FIG. 8 shows third measurement results from a comparison of a cushion according to the invention with a conventional cushion for vehicle seats.

A third measurement result, namely the water vapour absorption capacity with the minimum requirement of Fd×$10^2$>4, which is plotted on the ordinate, is reproduced in a further diagram in FIG. 8. This gives the buffer effect with respect to the water vapour/moisture compensation ratio again. In this case too it is again evident that the cushion according to the invention (passive climate seat) has a value in the buffer effect more than twice as high with respect to water vapour as a conventional cushion. In all the measurements it is to be assumed that a measurement has been made with respect to possible measurement values on the top side of the seat cushion.

Figure 9:
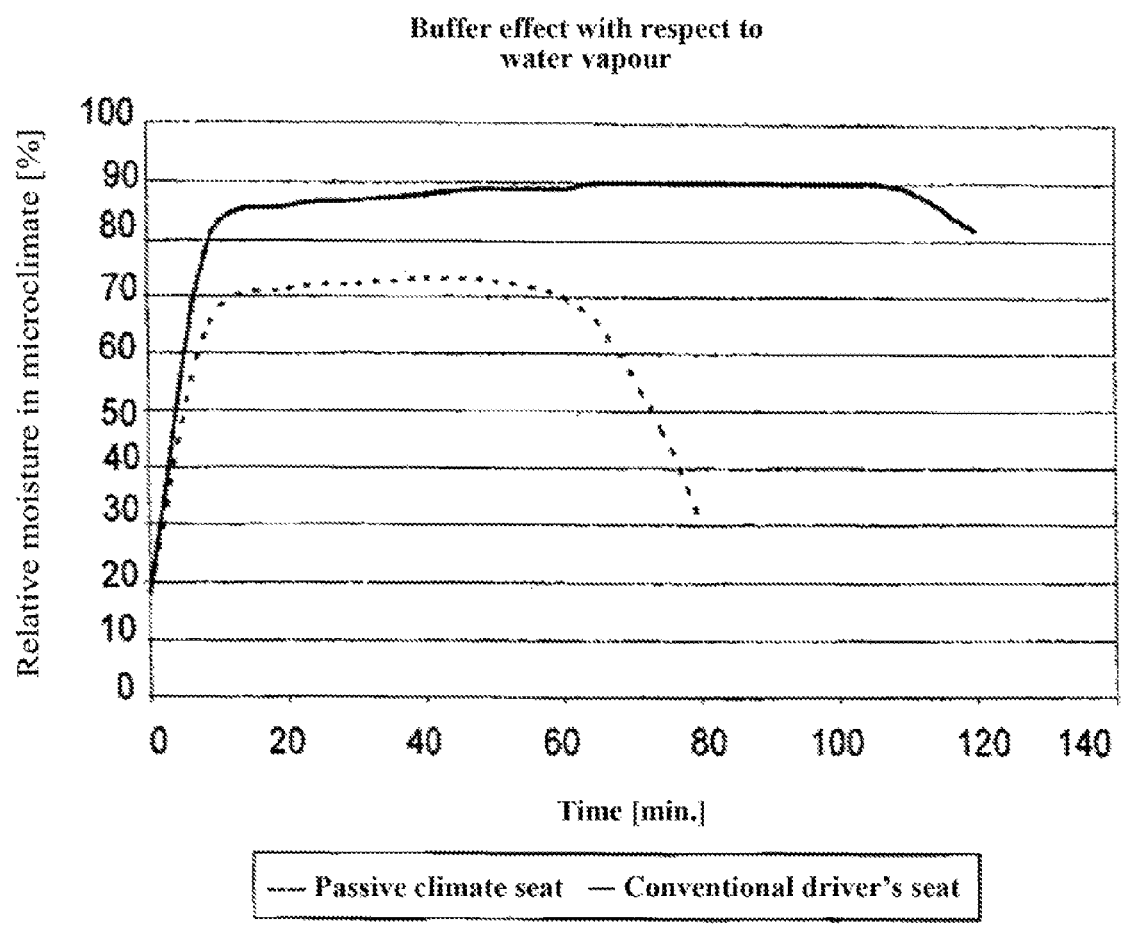
FIG. 9 is a diagram of fourth measurement results from a comparison of the cushion according to the invention with conventional cushions.

A fourth measurement result is reproduced in a diagram in FIG. 9. In the diagram, time is indicated over the abscissa and the relative moisture in the micro climate is indicated over the ordinate in the case of a conventional cushion and in the case of a cushion according to the invention. In this case it is evident that the buffer effect with respect to water vapour in the case of the cushions according to the invention (passive climate seat) has values of approximately 75% of relative moisture after a period of 70 minutes. After 20 minutes the moisture value drops from 75% to 30%. In the case of the conventional cushions on the other hand values of approximately 90% are measured over a period of from 10 to 110 minutes. In this way, a reduction in the moisture takes place relatively rapidly in the case of the cushions according to the invention as compared with conventional cushions.

All the features disclosed in the application documents are claimed as being essential to the invention, insofar as they are novel either individually or in combination as compared with the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle seat cushion for use with at least one of a seat part or a backrest of a vehicle seat, comprising:
  a cushion base part having a top and a bottom;
  a seat cover arranged to cover at least a portion of the top of the cushion base part; and
  a plurality of nubs extending from the bottom of the cushion base part at a substantially right angle towards the top of the cushion base part;
  a plurality of through ducts defined by the cushion base and arranged between at least some of the plurality of nubs extending downwards at least in part at a substantially right angle to the top of the cushion base part to facilitate air permeability and resiliency of the vehicle seat; and
  a plate positioned under the cushion, the plate defining a plurality of openings passing therethrough and aligned with the plurality of through ducts defined by the cushion base; and
  wherein the plurality of nubs include first nubs positioned in a thigh region of the seat and second nubs in regions other than the thigh region, the first nubs being shorter than the second nubs.

2. A vehicle seat cushion according to claim 1, wherein the plurality of nubs are distributed over and extend from the bottom of the cushion base part to create a plurality of interspaces arranged between adjacent nubs and configured to facilitate a flow of air or water vapour along the plurality of interspaces.

3. A vehicle seat cushion according to claim 2, further comprising:
  at least one air removal and supply duct arranged laterally on the cushion base part and emerging laterally on the vehicle seat, and
  wherein the interspaces open into the at least one air removal and supply duct.

4. A vehicle seat cushion according to claim 2, wherein the plurality of interspaces between adjacent nubs range of from 5 to 20 mm in the state of the unoccupied vehicle seat and a range of from 5 to 15 mm in the state of the occupied vehicle seat.

5. A vehicle seat cushion according claim 1, wherein the nubs have a height in a range of from 5 to 20 mm in the state of the unoccupied vehicle seat.

6. A vehicle seat cushion according to claim 1, wherein the plurality of nubs are arranged in a plurality of rows.

7. A vehicle seat cushion according to claim 1, wherein in the vertical direction a majority of the plurality of nubs are made of foam and have a cross-section that is trapezoidal.

8. A vehicle seat cushion according to claim 1, wherein in the direction transverse to the vertical direction a majority of the plurality of nubs have a cross-section that is at least one of round, elliptical, polygonal, rectangular or square.

9. A vehicle seat cushion according to claim 1, wherein the through ducts pass through the cushion base part.

10. A vehicle seat cushion according to claim 1, further comprising at least one of a ventilation layer, a cut foam layer, a heating layer, or a moisture-absorbing layer arranged between a majority of the plurality of nubs and the seat cover.

11. A vehicle seat cushion according to claim 10, further comprising a plurality of the group of a ventilation layer, a cut foam layer, a heating layer or a moisture-absorbing layer arranged between the nubs and the seat cover in the sequence as viewed upwards from the plurality of nubs to the seat cover.

12. A vehicle seat cushion according to claim 1, wherein the plurality of through ducts have a non-uniform distribution such that a greater concentration of through ducts are positioned over a posterior and thigh region of the cushion.

\* \* \* \* \*